Dec. 15, 1953  G. ARMSTRONG ET AL  2,662,521
AIR TREATED AND CONTROLLED MOBILE THERAPEUTIC CUBICLE
Filed April 5, 1951  6 Sheets-Sheet 1

INVENTOR.
GORDON ARMSTRONG
GEORGE KULCHER
BY DES JARDINS, ROBINSON & KEISER
Albert F. Robinson
THEIR ATTORNEYS Dec. 15, 1953  G. ARMSTRONG ET AL  2,662,521
AIR TREATED AND CONTROLLED MOBILE THERAPEUTIC CUBICLE
Filed April 5, 1951  6 Sheets-Sheet 3

*INVENTOR.*
GORDON ARMSTRONG
GEORGE KULCHER
*BY*
DES JARDINS, ROBINSON & KEISER

THEIR ATTORNEYS

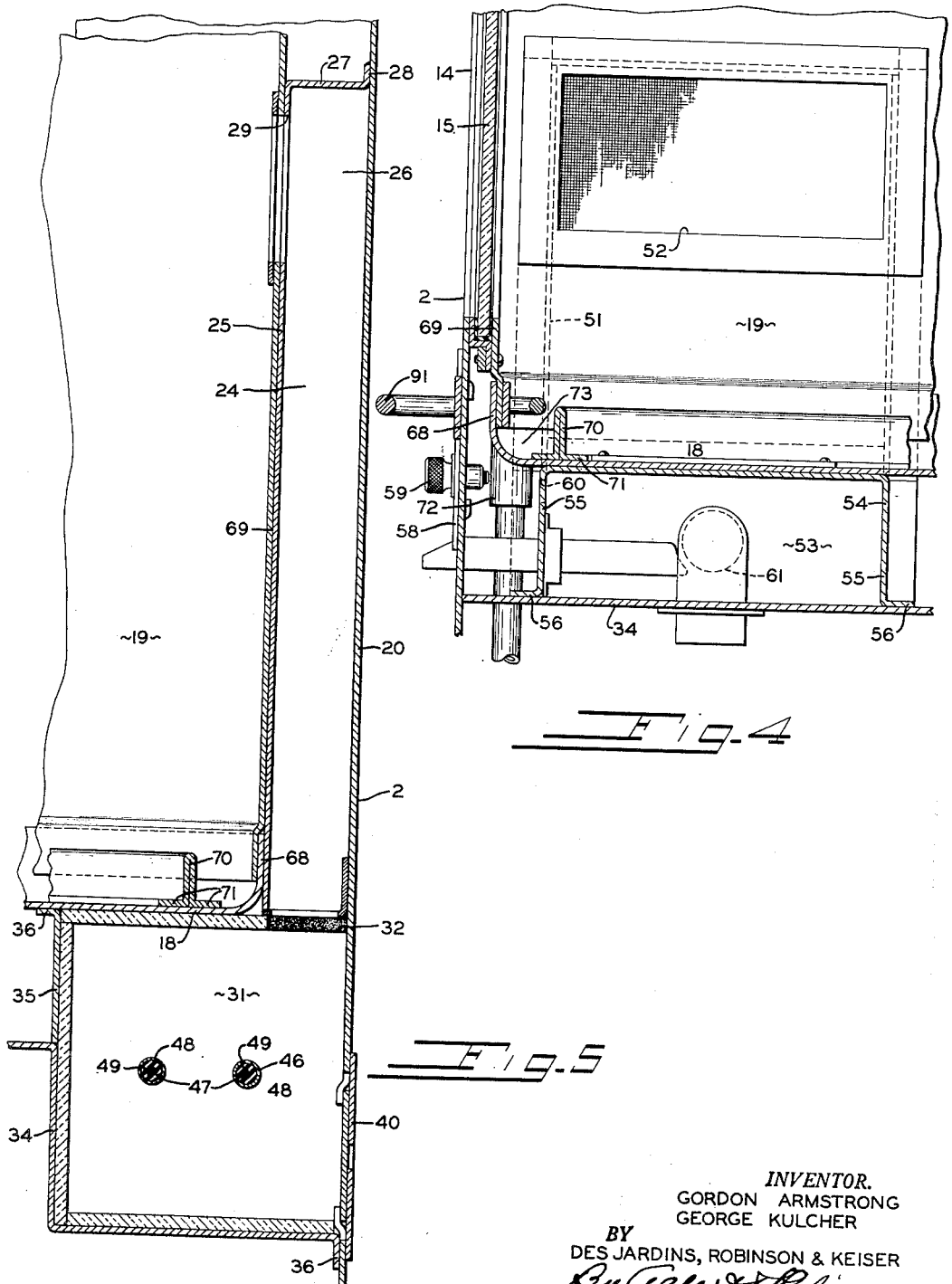

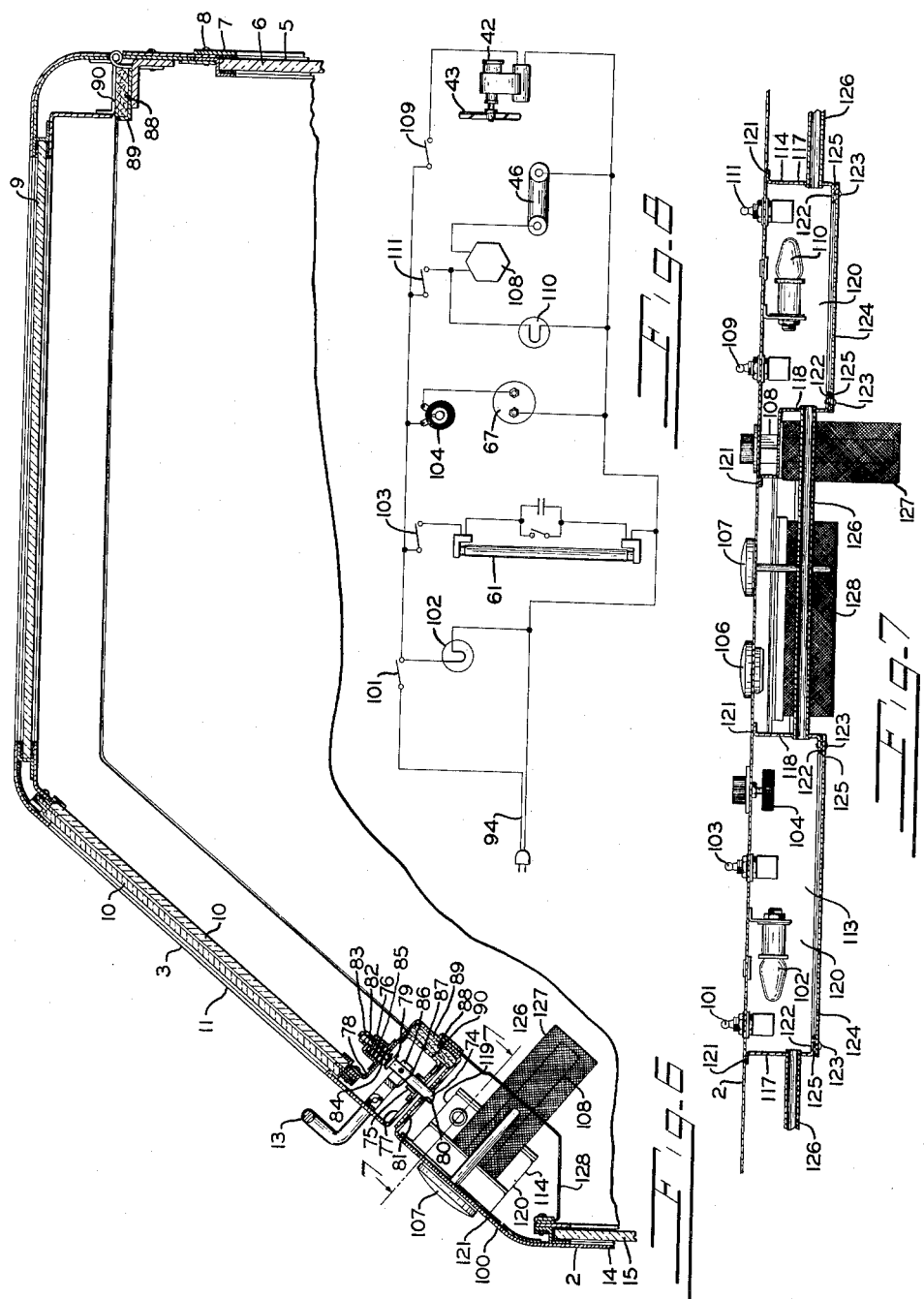

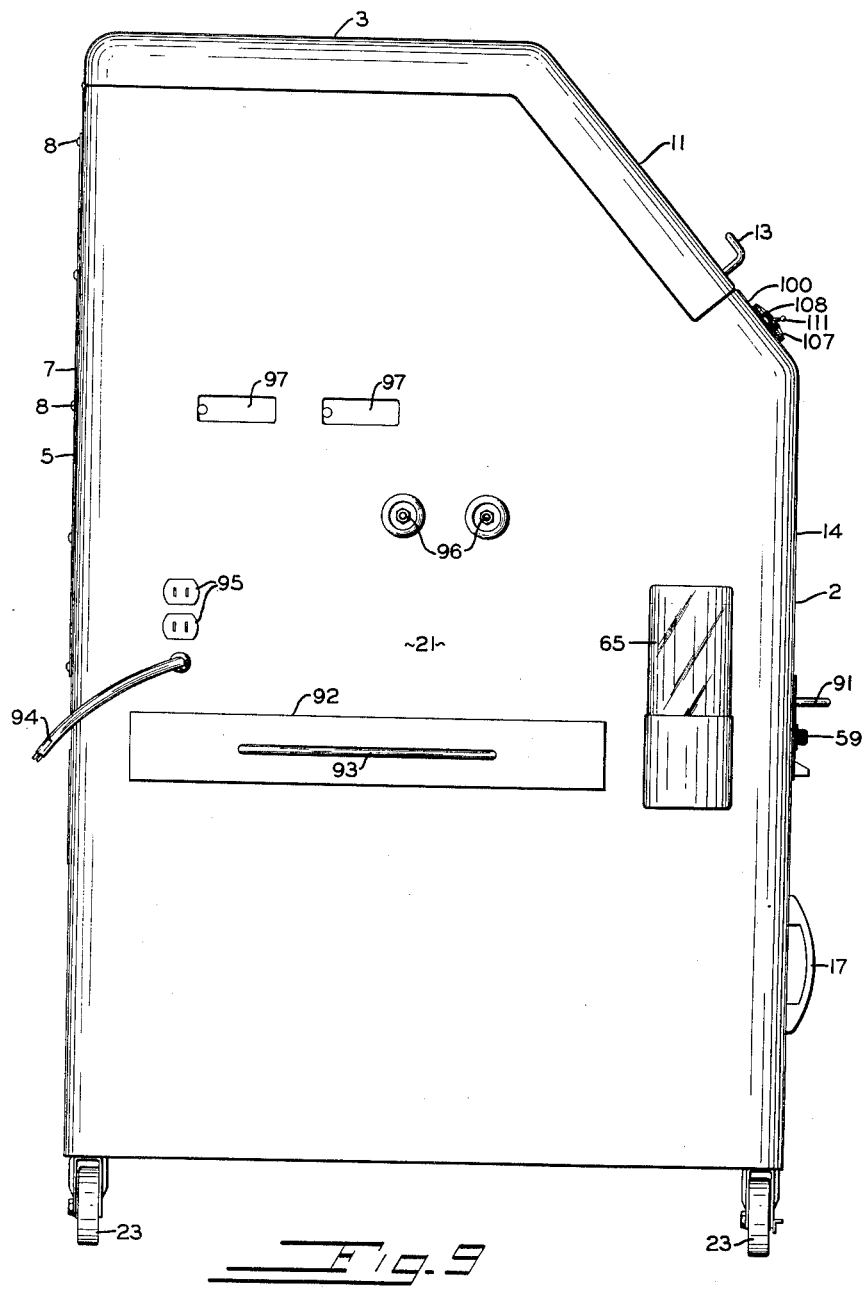

Patented Dec. 15, 1953

2,662,521

UNITED STATES PATENT OFFICE 2,662,521

AIR TREATED AND CONTROLLED MOBILE THERAPEUTIC CUBICLE

Gordon Armstrong and George Kulcher, Cleveland, Ohio, assignors to The Gordon Armstrong Company, Inc., Cleveland, Ohio, a corporation of Ohio Application April 5, 1951, Serial No. 219,478

14 Claims. (Cl. 128—1)

This invention relates to air treated and controlled mobile therapeutic cubicles and it particularly pertains to mobile therapeutic cubicles having an air circulating conduit provided with an inlet and discharge ends connected to a treating chamber or compartment in the cubicle and means for forcing circulation of air through the conduit to and from the treating chamber or compartment. Means is included in the forced air circulating system for controlling the flow of air through the circulating system, and the air to be circulated through the conduit is heated, humidified and sterilized.

Therapeutic cubicles heretofore constructed are relatively small, more of the nature of incubators, and rely solely upon gravity or a blower for the circulation of the air through the chamber or treating compartment thereof, but the air circulation therethrough and the condition of the circulated air is not effectively controlled and regulated or treated. Moreover, incubators as heretofore constructed have not provided for selectively drawing the air in from the inlet or recirculating air already in the incubator, or both. This selectivity of drawing the air from the outside or recirculating it in the system, or both, permits positive and effective control of the air supply to the incubator and the treating thereof in the treating chamber. New air taken into the circulating system or that which is recirculated is heated, humidified and sterilized, and means for so treating it is such that the condition of the air in the treating chamber is accurately and effectively controlled and regulated. The invention pertains to mobile therapeutic cubicles which are much larger than conventional incubators, but it is, of course, also suitable in the construction of conventional size incubators.

Accordingly, the main object of my invention is a mobile therapeutic cubicle having a forced air circulating system for treating and controlling its environment.

Another object of the invention is a mobile therapeutic cubicle in which the air that is circulated through the system is effectively treated.

Another object of the invention is a forced air circulating mobile cubicle which is simple in construction and effective in operation.

Another object of the invention is to treat and sterilize the air entering and leaving the mobile therapeutic cubicle.

Another object of the invention is a mobile therapeutic cubicle in which heating and humidifying of the air are separate and independent steps.

Still another object of the invention is a mobile therapeutic cubicle having parts that are replaceable and are readily accessible without interference with other parts of the construction.

Further objects and objects relating to details of construction and economies of operation will readily appear from the detailed description to follow.

In one instance, we have accomplished the objects of our invention by the device and means set forth in the following specification. Our invention is clearly defined and pointed out in the appended claims. A structure constituting a preferred embodiment of our invention is illustrated in the accompanying drawings forming a part of this specification, in which:

Fig. 4 is a cross sectional view on lines 4—4 of Fig. 2 looking in the direction of the arrows.

Fig. 5 is a cross sectional view on lines 5—5 of Fig. 3 looking in the direction of the arrows.

Fig. 6 is a sectional view through the top cover and upper portion of the cabinet taken along the vertical centerline.

Fig. 7 is a sectional view looking in the direction of the arrows on line 7—7 of Fig. 6.

Fig. 8 is a diagrammatic view of the electrical wiring.

Fig. 9 is a left end elevation of the cubicle.

Figure 1:
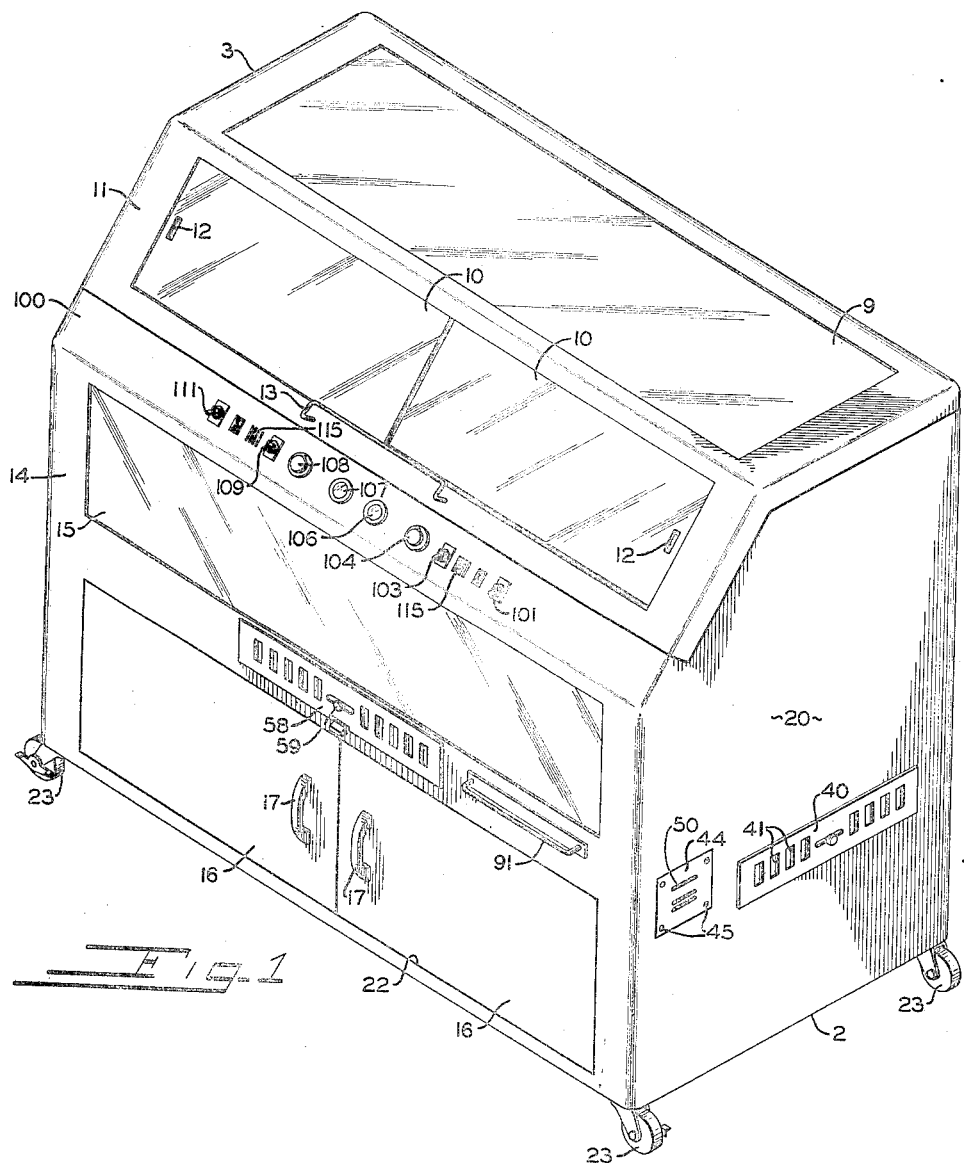
Fig. 1 is a perspective view of a mobile cubicle embodying our invention.
Figure 2:
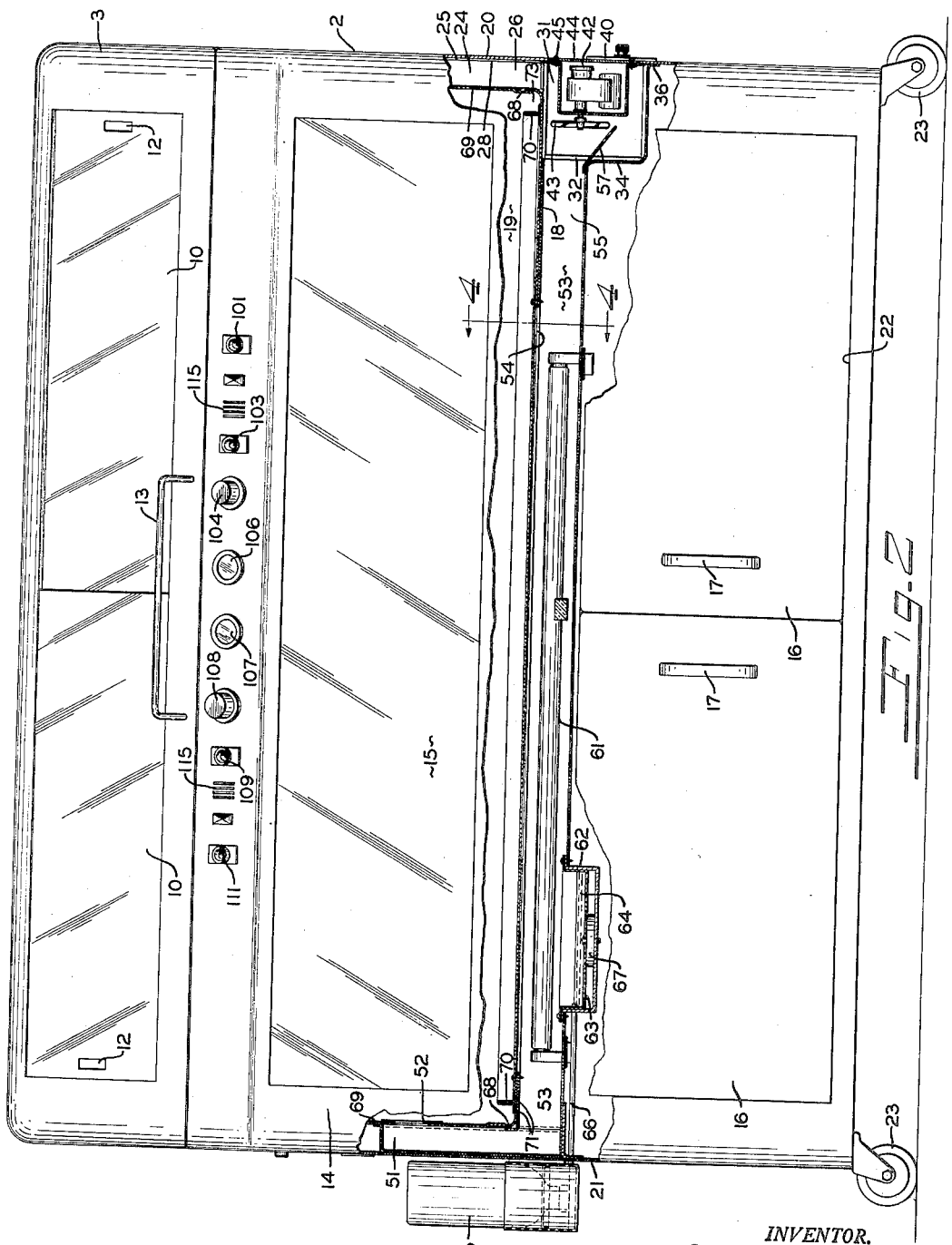
Fig. 2 is a front elevation of the mobile cubicle with parts broken away.
Figure 3:
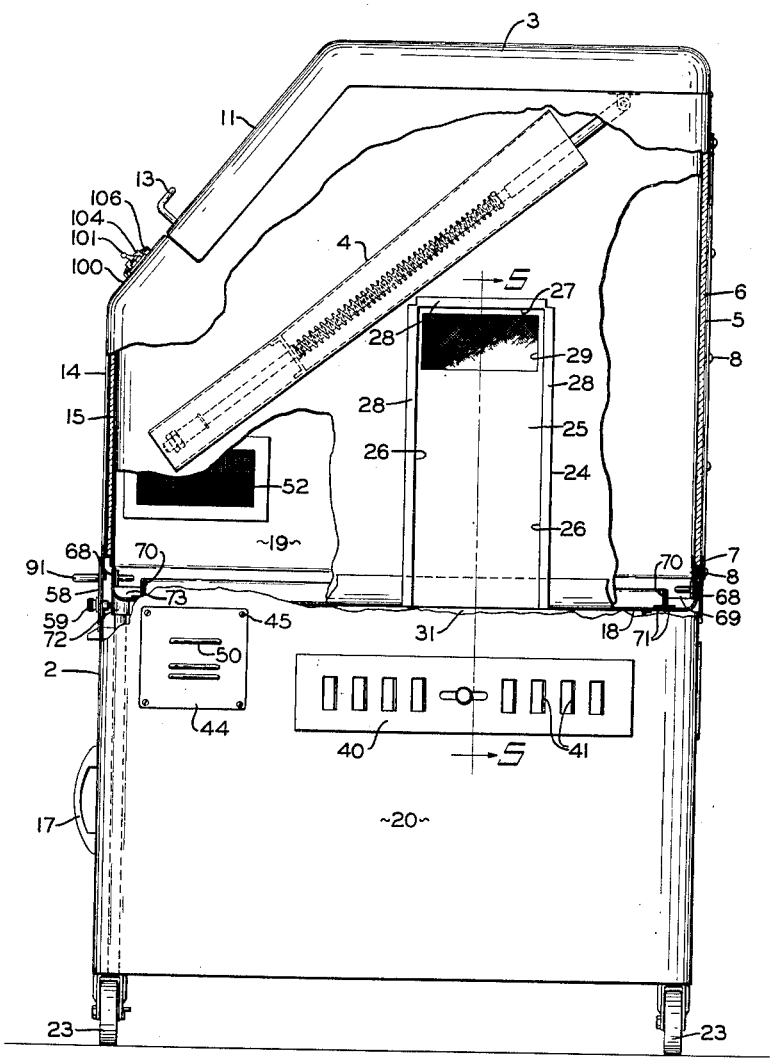
Fig. 3 is a right end elevation of the mobile cubicle with parts broken away.

Referring specifically to the drawings in which like numerals designate like parts, numeral 2 designates generally the base portion of a cubiform cabinet having an open top which is closed by a cover 3, hinged thereto, the cover being counter-balanced by means 4. The rear wall 5 of the base has a glass panel 6 fitted therein by a frame 7 fastened at 8 to the wall surrounding the opening for the frame. A glass panel 9 is also fitted to the top part of the cover 3, and two other glass panels 10 are slidably fitted in the front angular portion 11 of the cover with their adjacent ends lapped and their opposite ends provided with a handle 12 for sliding them lengthwise relatively to each other and to the cover in which they are slidably fitted. A latch releasing handle 13 is fitted to the free end of the cover whose opposite edge is hinged to the top of the back wall of the cabinet. The top front corner of the base portion of the incubator is slanted in conformity with the angular part 11 of the cover 3.

The front wall 14 has a glass panel 15 fitted therein, and therebeneath are hinged a pair of outwardly oppositely swinging doors 16, each being provided on its free end with a handle 17. These doors 16 close a storage space formed beneath the floor 18 of the treating chamber 19 between the rear wall 5 and end walls 20 and 21. The bottom of the storage space is floored horizontally with the bottom front side sill 22. The cabinet is mounted upon casters 23 so that it can be readily moved about over the floor.

On the inside of end wall 20, there is a vertically disposed conduit 24, this being formed by a channel member 25 having side walls 26 and end wall 27 flanged at 28 to be connected to said end wall 20 to close the open side of the channel member and form a conduit on the end of the incubator connected with the treating chamber. The top end of the conduit opens at 29 into the treating chamber, and its bottom end opens into the inlet chamber 31. The top, bottom and rear walls of this inlet chamber 31 are lined with insulating material 32. A portion of the end wall 20 of the cabinet forms the front wall of the inlet chamber. The top wall of the inlet chamber is formed by a portion of the floor 18 of the treating chamber, and its bottom and rear walls are formed by a plate 34 and filler piece 35 having flanged ends 36 welded to the end wall 20 and floor 18. An adjustable grate 40 is provided in the end wall 20 opening into the inlet chamber, this grate being of conventional construction with openings 41 adapted to be opened and closed.

A motor unit 42 carrying an air impeller blade 43 is mounted on a plate or panel 44 that is detachably connected by screws 45 to the end wall 20 surrounding an opening therein through which the motor and impeller unit is adapted to be inserted. A heating element 46 is placed within the inlet chamber 31 for heating the air which is drawn therethrough. The heating unit is an electrical resistance wire 47 which is surrounded by a heat radiating surface 48 insulated from the wire by interposed insulating material 49. Ventilating louvers 50 are formed in the panel or plate adjacent the motor.

The opposite end wall 21 of the incubator cabinet has a vertical conduit 51 opening at 52 at its top end into the treating chamber of the incubator and opening at its bottom end into a conduit 53 which extends lengthwise of the cabinet to be connected at its opposite end to the inlet chamber 31. This conduit 53 is likewise formed by a channel member 54 having side walls 55, flanged at 56, and connected to plate 34 to close the open side of the channel member 54. At the end of this conduit 53, adjacent the impeller blade, an inclined lip or ledge 57 is extended to direct the air from the impeller blade into the conduit. A discharge grill 58 is provided at the discharge opening with louvers adjustable at 59 for directing the discharged air. There are any number of perforations 60 formed in the forward side wall 55 of the conduit 53, in line with the discharge grill 58, for connecting the conduit with the grill (Fig. 4).

A germicidal lamp or lamps 61 is disposed lengthwise of the conduit 53 for exposure to the air passing therethrough. One 30-watt lamp is satisfactory, but one or more of the same or lesser wattage lamps can be used for killing any bacteria present in the air being circulated through the conduit. A humidifier 62 is also mounted in the conduit 53 for treating the air as it is drawn into the treating chamber, and the germicidal lamp or lamps 61 is disposed so that the humidifier is exposed to its rays.

The humidifier 62 comprises a pan or sump 63 formed in the bottom of the conduit 53 for containing and maintaining a supply of water 64 at a desired level in the pan or sump from a water feed supply. The water supply is contained within a bottle 65 supported with its open end down into a conduit 66 leading to the sump, this manner of water feed being of conventional construction. The water in the sump 63 is heated by an electrical heater 67.

The treating chamber in the cabinet is provided with the bottom 18 having a surrounding upwardly extending flange 68 for being secured, as by welding, to the side and end walls of an inner liner 69 contained within the outer walls of the cabinet. A floor area is set off by an inner surrounding rib 70, spaced inwardly from the surrounding flange 68, the inner surrounding rib 70 being formed from a metal strip having a retroverted web terminating in outwardly and oppositely disposed annular lips 71 that are fastened to the bottom 18 as by welding. A mattress or padding is adapted to be placed in the floor area bounded by the rib 70. A drain 72 is provided in the cabinet for removing any moisture tending to collect in the space 73 between the flange 68 and the rib 70.

The free end of the cover for the cabinet has a latch mounted thereon comprising a pin 74 slidably mounted in bearings 75 and 76 attached respectively to spaced-apart wall portions 77 and 78 of the cover in longitudinal alignment for receiving the pin. A thrust collar 79 is fixed to the pin 74 to abut against the end of bearing 76 when the pin is retracted from recess 80 in the adjacent edge 81 of the base portion of the cabinet at the top opening. A thrust nut 82 is screw-threaded on the end of the pin and locked by a clamp nut 83 also screw-threaded on the end of the pin. A coil spring 84, disposed about the pin, is inserted between the thrust collar 79 and the bearing 76 to be enclosed within a socket 85 formed in said bearing. The spring is normally held tensioned for holding the pin in latched position with the edge of the base portion of the cabinet. The pin 74 is pivotally fastened at its mid-portion to a pair of brackets 86 that are fixed to a cross piece 87 which is fixed to the free ends of the latch releasing handle 13, the handle being projected to the top of the cover in position to be readily accessible.

A sealing gasket of asbestos 88 is fixed to a ledge 89 on the base portion of the cabinet surrounding the top opening for seating with the surrounding edge 90 of the cover for effecting a close seal when the cover is closed.

The cover is provided with the balancing means 4 of conventional construction for holding it open to any desired position. Since this is of any conventional construction and not a part of the novelty of the present invention, it need not be described in detail. A balancing means of any construction can be used.

The front side of the cabinet is provided with handle 91 for moving it about from place to place over the floor. On the end of the cabinet on which the water supply means for the humidifier is mounted, there is room for a service drawer 92, having a handle 93, provided thereon. On this same end, there also may be provided a main power supply line 94 as well as electrical plugs 95 and inlet or nipples 96, the former being for any desired auxiliary electrical attachments and the latter for attaching tubes from supply sources of any therapeutic gases. One or more small slide doors 97 can be provided on this same end of the cabinet to allow treating tubes or other devices to be placed in the interior of the cabinet without opening the cover.

Along the slanted top surface 100 of the base portion in the cabinet, just below the cover, there is arranged a switch 101 for the main line, a green colored lens positioned in front of a pilot lamp 102 for showing when the power in the main line is on and off, a switch 103 for the germicidal lamp, a resistor 104 for the control of the coil heater 67 that forms a part of the humidifier, a wet or dry bulb type hygrometer 106, a thermometer 107, a thermoswitch 108, a switch 109 for the motor of the air impeller unit, and a red colored lens positioned in front of a pilot lamp 110 for indicating the one and off positions of a switch 111 for the heater in the air inlet. The thermoswitch 108 is associated with the switch 111 and the heating element 46 in the inlet chamber 31.

As shown in Fig. 7 of the drawings, certain of the various parts mounted on the slanted top portion 100 are contained within chambers provided immediately therebeneath on the underside of this slanted top portion. As is well known in the presence of surrounding gases in hospital operating and delivery rooms, certain electrical parts such as switches, lights, resistors, and the like are hazardous because of the danger of them causing an explosion. It is, therefore, desired to have an air sealed chamber 113 that contains the main switch 101, pilot lamp 102, switch 103, and resistor 104, and another air sealed chamber 114 containing switch 109, pilot lamp 110, and switch 111. There are louvers 115 provided in the slanted portion 100 for each of the air sealed chambers to allow the heat from the pilot lamps to escape. If an explosion takes place because of an electrical spark, it will be confined to the air sealed chambers, or outside the confines of the treating chamber. The treating chamber of the cabinet is completely protected from any danger of explosion.

The chambers consist of end walls 117 and 118 and side walls 119 and 120, all having an outwardly turned flange 121, by which they are welded to the underside of the slanted portion 100. Another flange 122 is turned in on the outer edge of these walls, into which screws 123 may be threaded to clamp on a cover plate 124. There is a gasket 125 interposed between the flange 122 and the cover plate 124. In order that electric wires may be run to the air sealed chambers, tubes 126 connect them with the side walls of the inner liner and also connect the two chambers.

Since the thermoswitch gets hot, it is covered in some way to prevent it being contacted by the occupant of the cubicle. For this purpose there is provided a wire shield 127, fixed on a part of the chamber 114. Another protective wire screen shield 128 covers the hygrometer and thermometer to prevent them from being damaged.

The electrical wiring diagram in Fig. 8 shows the wiring and the control switches for the various electrical parts which have been described above.

In the above described construction, regulation of the air circulated through the treating compartment is provided as well as the conditioning thereof. The air to be circulated is forced through the treating chamber, and selection can be made of air from the surrounding atmosphere or from the treating chamber, or both, but from whatever source obtained to be forced through the treating chamber, it is heated, humidified and freed from bacteria. The grate means provided at the discharge point of the conduit is regulated to control the pressure of air maintained within the treating chamber. The air is not only subjected to the germicidal lamp to free it from bacteria before entering the treating chamber of the cabinet but it is also subjected to the lamp for this same purpose before it is discharged from the cabinet, thereby preventing contamination of the surrounding atmosphere from the mobile cubicle as well as the air circulated within the cabinet from the surrounding atmosphere.

We are aware that there may be various changes in details of construction without departing from the spirit of our invention, and, therefore, we claim our invention broadly as indicated by the appended claims.

Having thus described our invention, what we claim as new and useful and desire to secure by United States Letters Patent, is:

1. A controlled forced air circulating and treating therapeutic mobile cubile comprising a treating chamber having inlet and outlet passages at opposite ends thereof through which air is circulated from a conduit directly connected to each of the inlet and outlet passages, an air impelling means for circulating air through the treating chamber and said conduit from the inlet to outlet passage, a humidifier within the inlet passage, a heater for the humidifier and for the air as it passes through the inlet passage to the treating chamber, a germicidal lamp disposed in said conduit between the inlet and outlet passages to which the air is exposed in passing to the treating chamber, adjustable means for regulating the pressure of the air within the treating chamber.

2. A controlled forced air circulating and treating therapeutic mobile cubicle as set forth in claim 1 in which there is a heating means for the humidifier separate from and in addition to heating means for the air.

3. A controlled forced air circulating and treating therapeutic mobile cubicle comprising a treating chamber having inlet and outlet passages at opposite ends thereof through which air is circulated through said treating chamber from a conduit directly connected to each of the inlet and outlet passages at the opposite ends of said chamber, an air impeller for forcing air through the treating chamber and said conduit from the inlet to the outlet passage, a heater for heating the incoming air, a humidifier, a heater for the humidifier, a germicidal lamp disposed adjacent the inlet passage into the treating chamber in the path of the incoming air and to which the humidifier is exposed, and adjustable means for regulating the pressure of the air within the treating chamber.

4. A controlled forced air circulating and treating therapeutic mobile cubile as set forth in claim 3 in which the said air impeller is part of a unit detachably mounted on the cubicle.

5. A controlled forced air circulating and treating therapeutic mobile cubicle as set forth in claim 3 in which the means for controlling the air pressure is an adjustable draft regulator.

6. A controlled forced air circulating and treating therapeutic mobile cubicle comprising a treating chamber having inlet and outlet passages connected with the opposite ends of said chamber for drawing air in and recirculating it through said treating chamber and conduit from the inlet to outlet passage, an air impeller, a heater disposed to heat the air to be drawn in to the treating chamber, a humidifier, means for heating the humidifier, a germicidal lamp disposed to have both the incoming and recirculated air exposed thereto, and adjustable means for controlling the discharge of the air being circulated.

7. A controlled forced air circulating and treating therapeutic mobile cubicle comprising a treating chamber having inlet and outlet passages connected to the opposite ends of said chamber for permitting drawing in and circulating air through said treating chamber, an air impeller comprising a fan and motor unit for operating said fan for circulating air through the treating chamber, a heater disposed to heat the air to be circulated to the treating chamber, a humidifier comprising a sump formed in the inlet passage for containing a liquid, a germicidal lamp mounted in the inlet passage with a portion thereof above the sump, and adjustable means for controlling the discharge of air being circulated, said air control means being located between the air inlet and outlet passages.

8. A controlled forced air circulating and treating therapeutic mobile cubicle comprising a treating chamber having inlet and outlet passages connected to the opposite ends of said chamber through which air is drawn in and recirculated through said chamber, a connecting conduit between the inlet and outlet passages, a passage through which the circulated air is discharged from the chamber, means for circulating the air through said chamber, a germicidal lamp disposed in the path of the circulating air for the air to be subjected thereto before entering and after leaving the treating chamber, and adjustable means for regulating the pressure of the air within the treating chamber.

9. A controlled forced air circulating and treating therapeutic mobile cubicle as set forth in claim 8 in which means is provided for humidifying the air before being circulated in said chamber.

10. A controlled forced air circulating and treating therapeutic mobile cubicle comprising a treating chamber having inlet and outlet passages connected to the opposite ends of said chamber through which air is drawn in and recirculated through said chamber, a passage connecting the inlet and outlet passages, means for impelling air through the connecting passage, a germicidal lamp mounted in the connecting passage between the inlet passage and the outlet passage for exposing thereto air passing through the inlet passage and the outlet passage; and adjustable means for regulating the pressure of the air within the treating chamber.

11. A controlled forced air circulating and treating therapeutic mobile cubicle as set forth in claim 10 having a heater mounted in the inlet passage.

12. A controlled forced air circulating and treating therapeutic mobile cubicle as set forth in claim 11 having a humidifier mounted in the connecting passage.

13. A controlled forced air circulating and treating therapeutic mobile cubicle as set forth in claim 12 having a heater for the humidifier.

14. A controlled forced air circulating and treating therapeutic mobile cubicle as set forth in claim 13 in which the humidifier is a sump formed in the bottom of the connecting passage.

GORDON ARMSTRONG.
GEORGE KULCHER.

References Cited in the file of this patent

UNITED STATES PATENTS

| Number | Name | Date |
|---|---|---|
| 2,243,999 | Chapple | June 3, 1941 |
| 2,417,962 | Armstrong | Mar. 25, 1947 |
| 2,559,654 | Netteland | July 10, 1951 |
| 2,600,240 | Grieb | June 10, 1952 |